US011261782B1

(12) United States Patent
Alvis (10) Patent No.: US 11,261,782 B1
(45) Date of Patent: Mar. 1, 2022

(54) PORTABLE AC POWER PACK

(71) Applicant: Donald W. Alvis, Oregon, WI (US)

(72) Inventor: Donald W. Alvis, Oregon, WI (US)

( * ) Notice: Subject to any disclaimer, the term of this patent is extended or adjusted under 35 U.S.C. 154(b) by 0 days.

(21) Appl. No.: 16/857,875

(22) Filed: Apr. 24, 2020

(51) Int. Cl.
  *F02B 63/04* (2006.01)
  *H02K 7/18* (2006.01)
  *H02K 11/04* (2016.01)
  *H02K 11/00* (2016.01)

(52) U.S. Cl.
  CPC ......... *F02B 63/048* (2013.01); *H02K 7/1815* (2013.01); *H02K 11/0094* (2013.01); *H02K 11/046* (2013.01); *F02B 2063/045* (2013.01)

(58) Field of Classification Search
  CPC ............. H02K 7/1815; H02K 11/0094; H02K 11/046; F02B 63/048; F02B 2063/045
  USPC ..................... 290/1 A, 50; 190/18 A; 280/30
  See application file for complete search history.

(56) References Cited

U.S. PATENT DOCUMENTS

| | | | | |
|---|---|---|---|---|
| 3,144,014 A * | 8/1964 | Mantell, Jr. | ............... | A45F 3/04 126/38 |
| 4,362,307 A * | 12/1982 | Nakatani | ................... | A45F 3/08 224/153 |
| 5,077,513 A * | 12/1991 | Dea | ...................... | H01M 50/20 320/115 |
| 5,863,055 A * | 1/1999 | Kasravi | ................. | B62B 5/0023 280/47.29 |
| 6,310,404 B1 * | 10/2001 | Frank | ...................... | F02B 63/04 290/1 A |
| 6,374,524 B1 * | 4/2002 | Capps | .................. | G08G 1/0955 320/115 |
| 6,561,395 B2 * | 5/2003 | Lim | ......................... | A45C 5/14 190/103 |
| 7,004,481 B1 * | 2/2006 | Stanish | .................. | A45C 5/146 190/108 |
| 7,036,641 B2 * | 5/2006 | Russo | .................... | A45C 5/143 190/115 |
| 7,461,857 B2 * | 12/2008 | Darling, III | ........... | A61G 1/013 280/47.18 |
| 7,526,833 B2 * | 5/2009 | Cochran | ............... | A47L 7/0028 15/327.2 |
| 7,597,341 B2 * | 10/2009 | Russo | .................... | A45C 5/143 190/18 A |
| 7,617,956 B1 * | 11/2009 | Sabbah | .................. | A45C 5/143 190/18 A |
| 7,766,365 B2 * | 8/2010 | Darling, III | ............ | B62B 1/002 280/640 |
| 7,775,530 B2 * | 8/2010 | Darling, III | ......... | A61G 1/0293 280/47.18 |
| 8,154,137 B1 * | 4/2012 | Flegel | ................... | F02B 63/042 290/1 A |
| 8,302,976 B2 * | 11/2012 | Okabe | .................... | B62B 5/067 280/47.24 |
| 8,328,207 B2 * | 12/2012 | Hirose | ................... | F02B 63/04 280/47.131 |
| 8,641,056 B1 * | 2/2014 | Carter | ...................... | B62B 1/12 280/30 |

(Continued)

*Primary Examiner* — Pedro J Cuevas
(74) *Attorney, Agent, or Firm* — Cramer Patent & Design, PLLC; Aaron R. Cramer (57) ABSTRACT

A portable power pack is carried on a back frame and harness. The power pack is battery-operated or gasoline-operated capable of generating up to two thousand two hundred Watts (2200 W) of 110-VAC power. A removable shroud can also be selectively attachable to the frame if so desired.

8 Claims, 7 Drawing Sheets

(56) References Cited

U.S. PATENT DOCUMENTS

| | | | |
|---|---|---|---|
| 8,733,766 B2* | 5/2014 | Nieman | A45C 13/385 280/47.17 |
| 8,833,624 B2 | 9/2014 | Miyamoto | |
| 9,364,125 B2 | 6/2016 | Takahashi | |
| 9,391,305 B2 | 7/2016 | Yoshinari et al. | |
| 9,496,536 B2 | 11/2016 | Yoshinari et al. | |
| 9,797,306 B1* | 10/2017 | Stapleton | F02B 63/047 |
| 9,854,887 B2* | 1/2018 | Yu | A45F 4/02 |
| 10,039,367 B2 | 8/2018 | Yoshinari et al. | |
| 10,144,246 B2* | 12/2018 | Winfield | A45F 3/04 |
| 10,186,886 B2 | 1/2019 | Rippel et al. | |
| 10,348,114 B2 | 7/2019 | Rippel et al. | |
| 2003/0209886 A1* | 11/2003 | Darling, III | A61G 1/0231 280/652 |
| 2004/0088817 A1* | 5/2004 | Cochran | A47L 9/0027 15/327.5 |
| 2004/0144606 A1* | 7/2004 | Han | A45C 5/14 190/18 A |
| 2004/0183263 A1* | 9/2004 | Joncourt | B62B 1/20 280/1.5 |
| 2004/0238303 A1* | 12/2004 | Hafif | A45C 5/143 190/18 A |
| 2005/0103589 A1* | 5/2005 | Russo | A45C 5/143 190/18 A |
| 2006/0119057 A1* | 6/2006 | Russo | A45F 4/02 280/47.18 |
| 2006/0170173 A1* | 8/2006 | Darling, III | B62B 1/12 280/79.2 |
| 2006/0186622 A1* | 8/2006 | Darling, III | B62B 1/002 280/35 |
| 2007/0113369 A1* | 5/2007 | Cochran | A47L 9/242 15/327.5 |
| 2008/0030003 A1* | 2/2008 | Darling, III | B62B 13/18 280/651 |
| 2009/0322046 A1* | 12/2009 | Hirose | F02B 63/04 280/47.371 |
| 2012/0126499 A1* | 5/2012 | Nieman | B62B 1/042 280/30 |
| 2014/0011061 A1 | 1/2014 | Yoshinari et al. | |
| 2015/0194647 A1 | 7/2015 | Yoshinari et al. | |
| 2019/0076844 A1* | 3/2019 | Jacobs | A45C 5/14 |

* cited by examiner

PORTABLE AC POWER PACK

RELATED APPLICATIONS

None.

FIELD OF THE INVENTION

The present invention relates generally to a power pack and more specifically to a portable power pack.

BACKGROUND OF THE INVENTION

Many Americans spend countless hours maintaining and beautifying their lawns and landscape. As a matter of pride and personal expression, these people manicure their grass, plant and maintain flowers, shrubs, bushes and trees all for the sake of enhancing the aesthetic qualities of their property. In performing these tasks, one uses a wide variety of power equipment to make the job easier.

One of the most common is a weed trimmer, which is available powered by an electric motor or by a gasoline engine. While the electric version is lighter and quieter to operate, it is plagued by its electric power cord which tethers it to a limited radius to a power outlet, which might not always be available. The gas-powered version, while free to roam, is loud, forcing the use of hearing protection and is heavier to carry, which can quickly fatigue even the strongest of individuals, especially if used for hours on end such as those on a landscaping crew. Accordingly, there exists a need for a means by which the ease of use and functionality of a weed eater can be maintained while addressing the problems described above. The development of the portable AC backpack fulfills this need.

SUMMARY OF THE INVENTION

It is therefore an object of the present invention to provide a portable AC generating device, which comprise a backpack frame which in turn has a wheeled frame, a handle, a plurality of cross members, a pair of shoulder straps, a waist strap, a back padding, a bottom platform, an upper part, and a lower part. The portable AC generating device also comprises a pair of support straps which support the bottom platform and a gasoline-powered electric generator which is placed upon the bottom platform and held in place by one or more attachment straps. The gasoline-powered electric generator provides one or more AC receptacles each producing AC power at the desired voltage and current.

A separate embodiment of the portable AC generating device comprises a backpack frame which has a wheeled frame, a handle, a plurality of cross members, a pair of shoulder straps, a waist strap, a back padding, a bottom platform, an upper part, a lower part, a pair of support straps which support the bottom platform, a deep cycle battery which is placed upon the bottom platform and is held in place by one or more first attachment straps, a DC to AC inverter which is located on the upper portion of the backpack frame and that is held in place with one or more second attachment straps, a pair of battery cables which electrically connect the battery terminals of the deep cycle battery to input a plurality of terminals of the DC to AC inverter, an AC receptacle which is provided on the DC to AC inverter, a yard equipment power cord in electrical communication with the one or more AC receptacles and a shroud covering over the gasoline-powered electric generator and the bottom platform from inclement weather.

The portable AC generating device also comprises a yard equipment power cord in electrical communication with the one or more AC receptacles and a shroud which covers over the gasoline-powered electric generator and the bottom platform from inclement weather. The upper part of the backpack frame terminates in a pair of parallel upright members.

Each of the pair of parallel upright members may include a plurality of apertures. The handle may allow an arm to telescope within each of the pair of parallel upright members of the backpack frame. The handle may be generally "U"-shaped and may also include a pair of spring-loaded pins that may engage a plurality of vertically aligned apertures to site the handle at a desired distance from the backpack frame. Attached to the lower part of the pair of parallel upright members of the backpack frame may be the bottom platform while attached to an inner side of the backpack frame may be a pair of wheel housings. The wheel housings may comprise wheels which rotatably attach within each of the pair of wheel housings. The pair of wheel housings may have a portion thereof that extends outside of the housing in order to enable contact with a surface to transport the portable AC generating device. The wheels may be mounted within the housings such that they do not contact the surface when the portable AC generating device is resting on the surface. The shroud may be removably attachable to the bottom platform and the backpack frame with a plurality of first clamps that enables the shroud to quickly be attached or detached.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 portable AC generating device
15 backpack frame
20 frame
21 adjustable handle
22 aperture
25 cross member 26 wheel
27 wheel housing
30 shoulder strap
35 waist strap
40 back padding
45 bottom platform
50 support strap
55 gasoline-powered electric generator
60 attachment strap
61 first shroud
62 second shroud
63 first clamp
64 second clamp
65 AC receptacle
70 yard equipment power cord
75 deep cycle battery
80 DC to AC inverter
85 battery cable
90 battery terminal
95 input terminal
100 user
105 electrically-powered yard equipment
110 shoulder
115 waist area
120 engine
125 generator
130 solid-state inverter

DESCRIPTION OF THE PREFERRED EMBODIMENTS

The best mode for carrying out the invention is presented in terms of its preferred and alternate embodiments, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Figure 1:
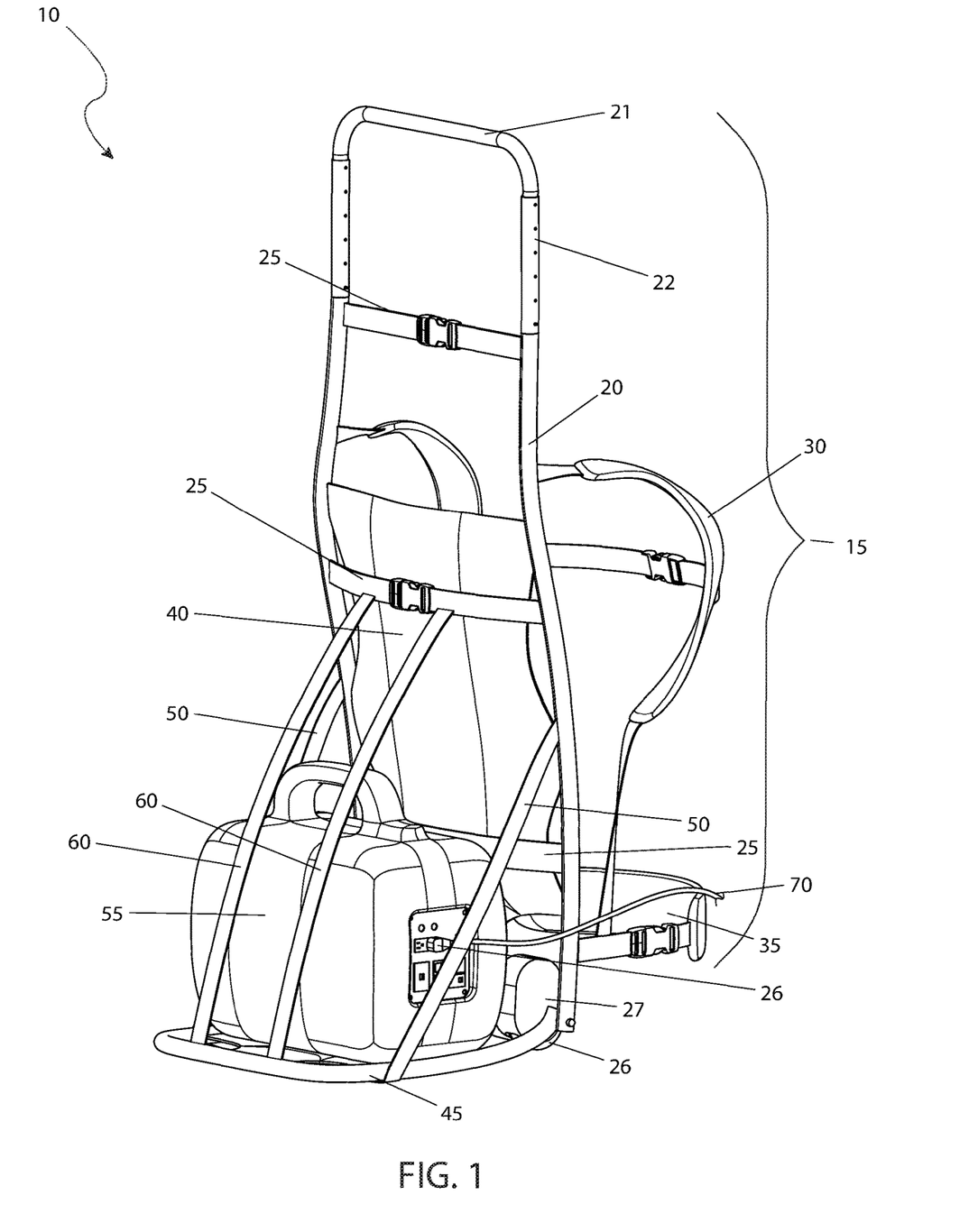
FIG. 1 is a perspective view of the portable AC generating device, according to a first embodiment of the present invention.

Referring now to FIG. 1, a perspective view of the portable AC generating device 10, according to the first embodiment of the present invention is disclosed. The portable AC generating device 10 (herein also described as the "device") 10, includes a backpack frame 15 comprising a wheeled frame 20, a handle 21, cross members 25, shoulder straps 30, a waist strap 35, back padding 40, and a bottom platform 45. The bottom platform 45 is supported by two (2) support straps 50. A gasoline-powered electric generator 55 is placed upon the bottom platform 45 and held in place by one (1) or more attachment straps 60. As expected, the gasoline-powered electric generator 55 provides one (1) or more AC receptacles 65, each capable of producing AC power at the desired voltage and current. A yard equipment power cord 70 is in electrical communication with the AC receptacle 65, whose further function will be described herein below.

The upper part of the frame 22 terminates in parallel upright members, each with a plurality of apertures 22. The handle 21 is generally "U"-shaped and is sized so that the arms thereof are capable of telescoping adjustment within the upright vertical members of the frame 20. The handle 21 preferably has a pair of spring-loaded pins that are capable of engaging vertically aligned apertures 22 to site the handle 21 at a desired distance from the frame 20. Attached to the lower parts of parallel upright frame members of the frame 20 is the bottom platform 45. Attached to an inner side of the frame 20, is a pair of wheel housing 27. A wheel 26 is rotatably attached within an individual wheel housing 27. The wheels 26 have a portion thereof that extends outside of the housing 27 in order to enable contact with a surface when it is desired to transport the device 10. The wheels 26 are mounted within the housings 27 such that they do not contact any ground surface when the device 10 is resting on the ground surface, merely the bottom of the frame 20 and bottom of the housings 27 do. It is appreciated that the wheels 26 are mounted in such a manner so as to contact the ground surface at an angle before any anti-tipping interlocks of the gasoline-powered electric generator 55 is tripped.

Figure 2:
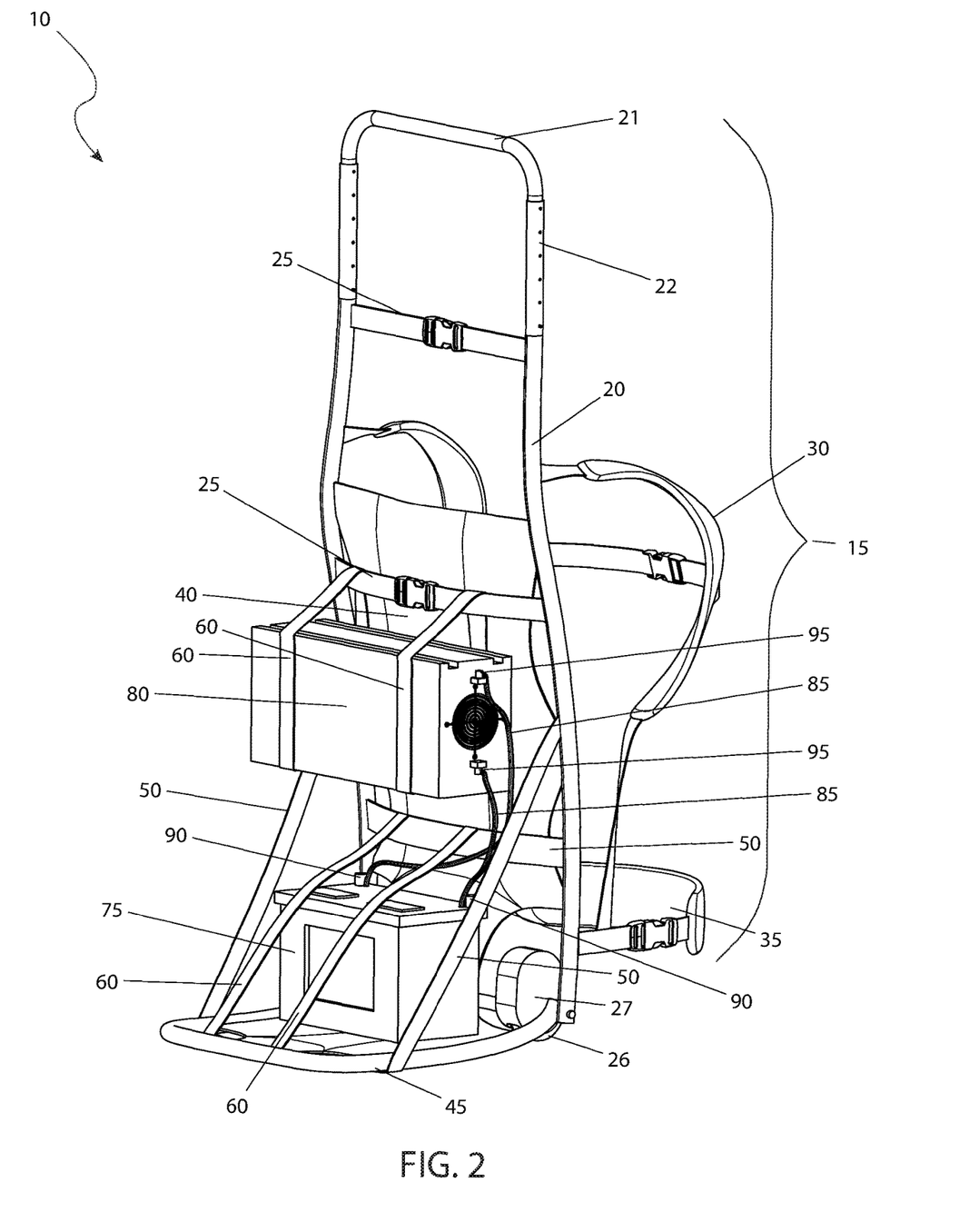
FIG. 2 is a perspective view of the portable AC generating device, according to a second embodiment of the present invention.

Referring next to FIG. 2, a perspective view of the device 10, according to the second embodiment of the present invention is depicted. As previously described in FIG. 1, the second embodiment also utilizes a backpack frame 15 comprising a wheeled frame 20, a handle 21, cross members 25, shoulder straps 30, a waist strap 35, back padding 40, and a bottom platform 45. The bottom platform 45 is supported by two (2) support straps 50 as before. A deep cycle battery 75 is placed upon the bottom platform 45 and held in place by one (1) or more attachment straps 60. A DC to AC inverter 80 is located on the upper portion of the frame 20 and held in place with one (1) or more attachment straps 60 as well. Two (2) battery cables 85 then electrically connect the battery terminals 90 of the deep cycle battery 75 to input terminals 95 of the DC to AC inverter 80. An AC receptacle 65 (not shown due to illustrative limitations) is provided on the DC to AC inverter 80 in a customary manner. As before, a yard equipment power cord 70 is in electrical communication with the AC receptacle 65, whose further function will be described herein below.

Figure 3A:
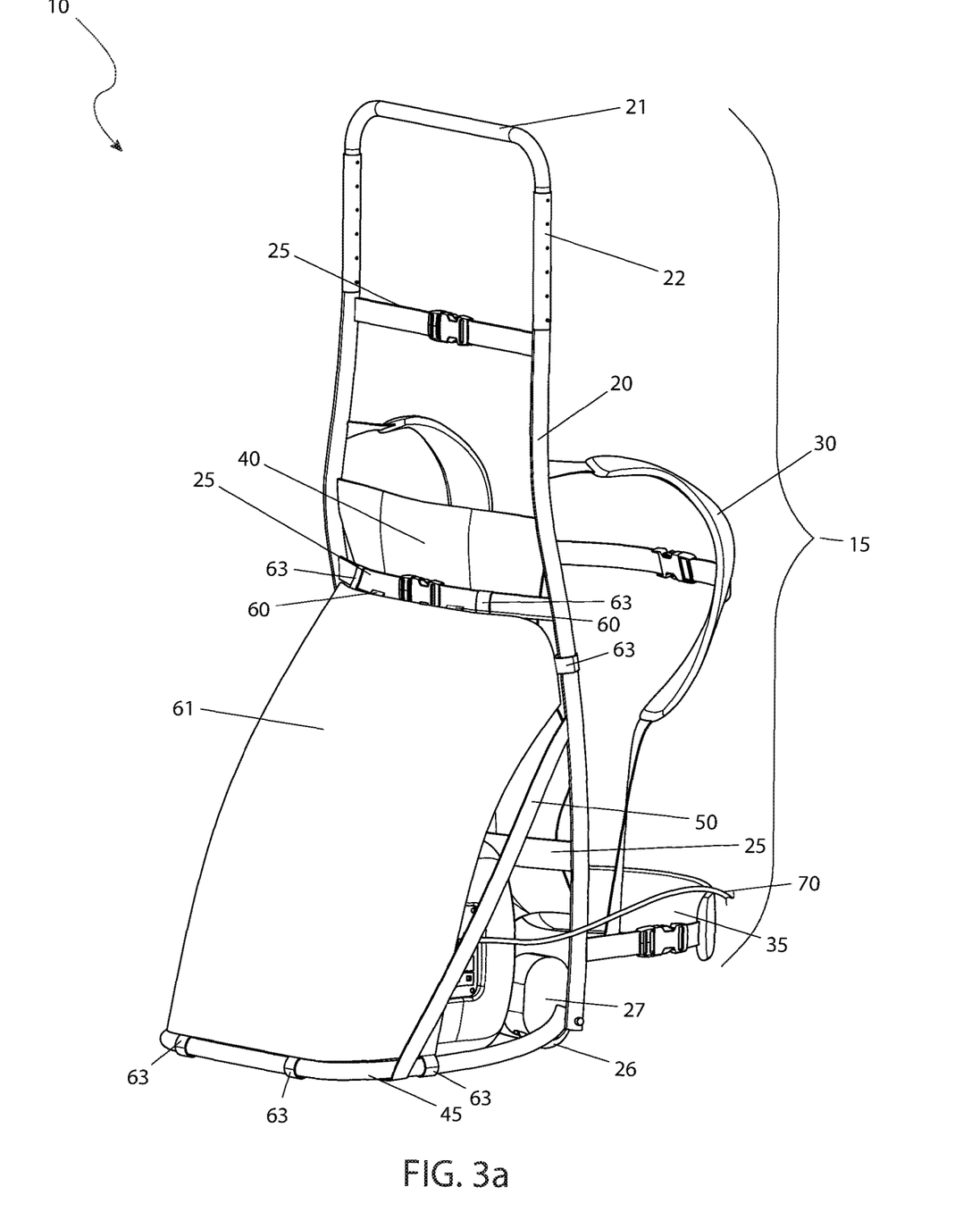
FIG. 3a is a perspective view of the portable AC generating device shown with a first shroud, according to the first embodiment of the present invention.

FIG. 3a illustrates the first embodiment of the device 10 with a first shroud 61 covering over the gasoline-powered electric generator 55. The first shroud 61 is sized to at least partly cover the gasoline-powered electric generator 55 and the bottom platform 55. Portions of the first shroud 61 may also, in other certain embodiments, cover at least one (1) cross member 25, the attachment straps 60, and a majority of the back padding 40. The first shroud 61 is envisioned to be removably attachable to the bottom platform 45 and frame 20 by use of first clamps 63 (e.g., friction-style C-clamps) that can enable the first shroud 61 to quickly be attached or detached, depending on preference of use. The first shroud 61 is envisioned to be able to protect the gasoline-powered electric generator 55 from inclement weather.

Figure 3B:
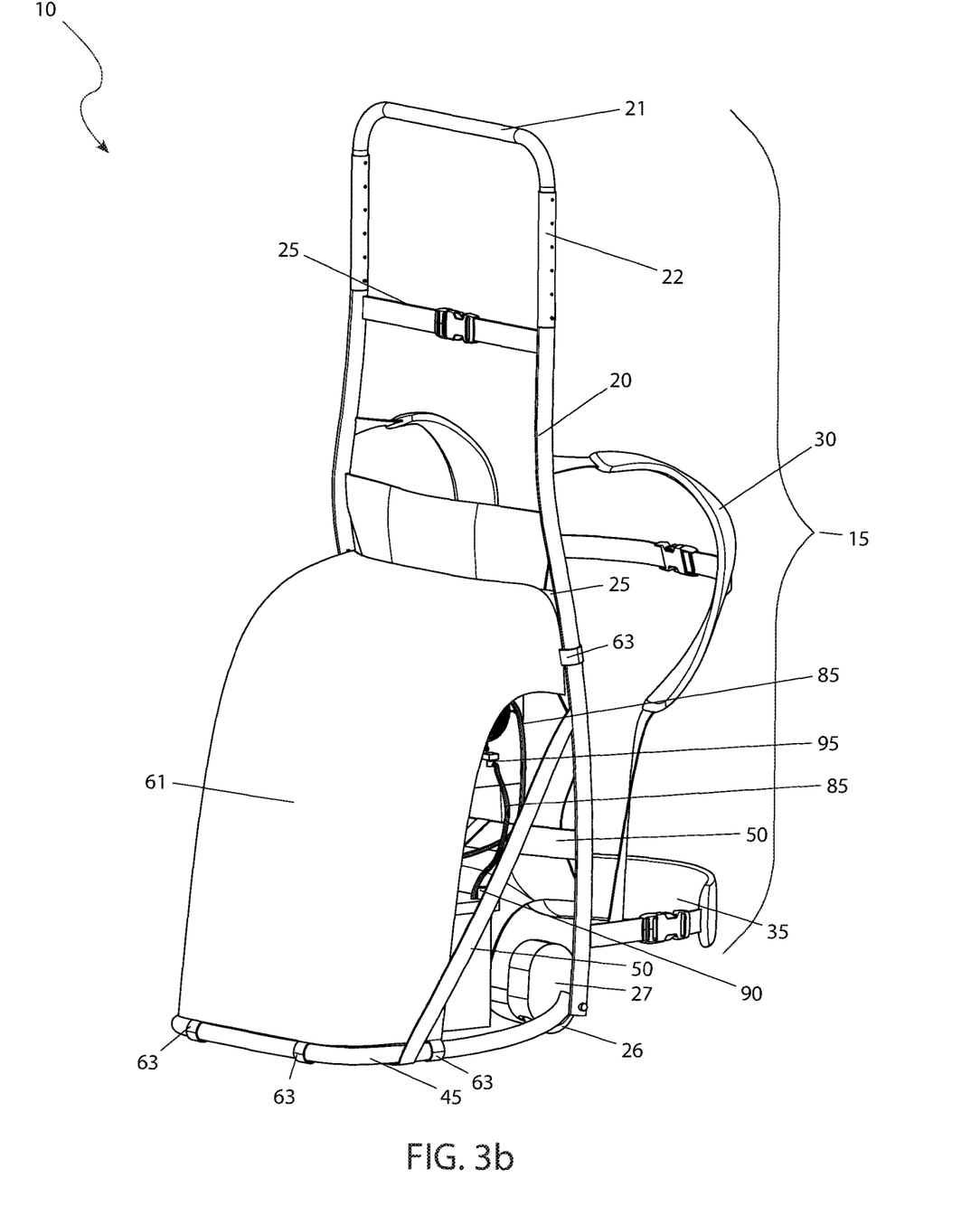
FIG. 3b is a perspective view of the portable AC generating device shown with a second shroud, according to the second embodiment of the present invention.

FIG. 3b illustrates the second embodiment of the device 10 with a second shroud 62 covering over the deep cycle battery 75 and DC to AC inverter 80. The second shroud 62 is sized to at least partly cover the deep cycle battery 75, the DC to AC inverter 80, the battery cables 85, and the bottom platform 55. Portions of the second shroud 62 may also, in other certain embodiments, cover at least one (1) cross member 25, the attachment straps 60, and a majority of the back padding 40. The second shroud 62 is envisioned to be removably attachable to the bottom platform 45 and frame 20 by use of second clamps 64 (e.g., friction-style C-clamps) that can enable the second shroud 62 to quickly be attached or detached, depending on preference of use. The second shroud 62 is envisioned to be able to protect the deep cycle battery 75, the DC to AC inverter 80, and the battery cables 85 from inclement weather.

Figure 4:
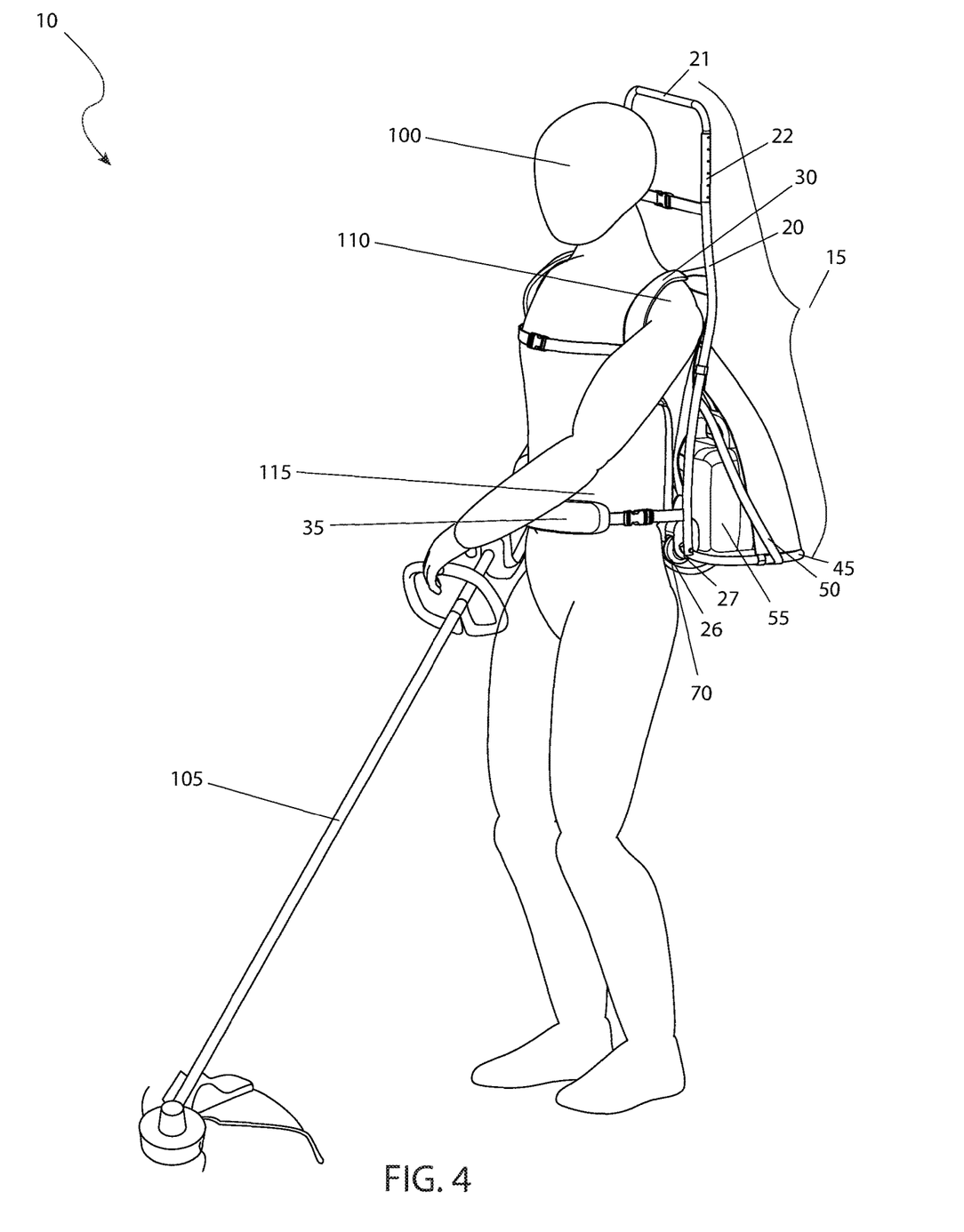
FIG. 4 is an environmental perspective view of the portable AC generating device shown in a utilized state, according to the first embodiment of the present invention.

Referring now to FIG. 4, a perspective view of the device 10, shown in a utilized state, according to the first embodiment of the present invention is shown. A user 100 is wearing the backpack frame 15 equipped with the gasoline-powered electric generator 55 as disclosed in FIG. 1. The user 100 is utilizing an electrically-powered yard equipment 105, herein depicted as a grass trimmer. It is noted however that other types of electrically-powered yard equipment 105 including but not limited to edgers, hedge trimmers, and even chainsaws may be used with the teachings of the device 10. As such, the use of the device 10 with any specific type of electrically-powered yard equipment 105 is not intended to be a limiting factor of the present invention.

The backpack frame 15 is worn in a typical fashion with the shoulder straps 30 secured about the shoulders 110 of the user and the waist strap 35 secured about the waist area 115 of the user. Such an arrangement allows for easy carrying of the gasoline-powered electric generator 55 for long periods of time without stress upon the back and muscles of the user 100. The electrically-powered yard equipment 105 is held by the hands of the user 100 and operated in an identical manner to that utilized should the electrically-powered yard equipment 105 be connected by an extension cord to a stationary AC outlet. The yard equipment power cord 70 connects the electrically powered yard equipment 105 to the AC receptacle 65 (not shown in this FIGURE due to illustrative limitations). The mobility of the device 10 allows the user 100 to travel anywhere without the customary restriction of cord connected electrically-powered yard equipment 105. It is noted that the second embodiment of the device 10 (as shown in FIG. 2) operates in the same manner as depicted in FIG. 4, with the exception of the yard equipment power cord 70 being connected to the DC to AC inverter 80 (as shown in FIG. 2) rather than the gasoline-powered electric generator 55.

Figure 5:
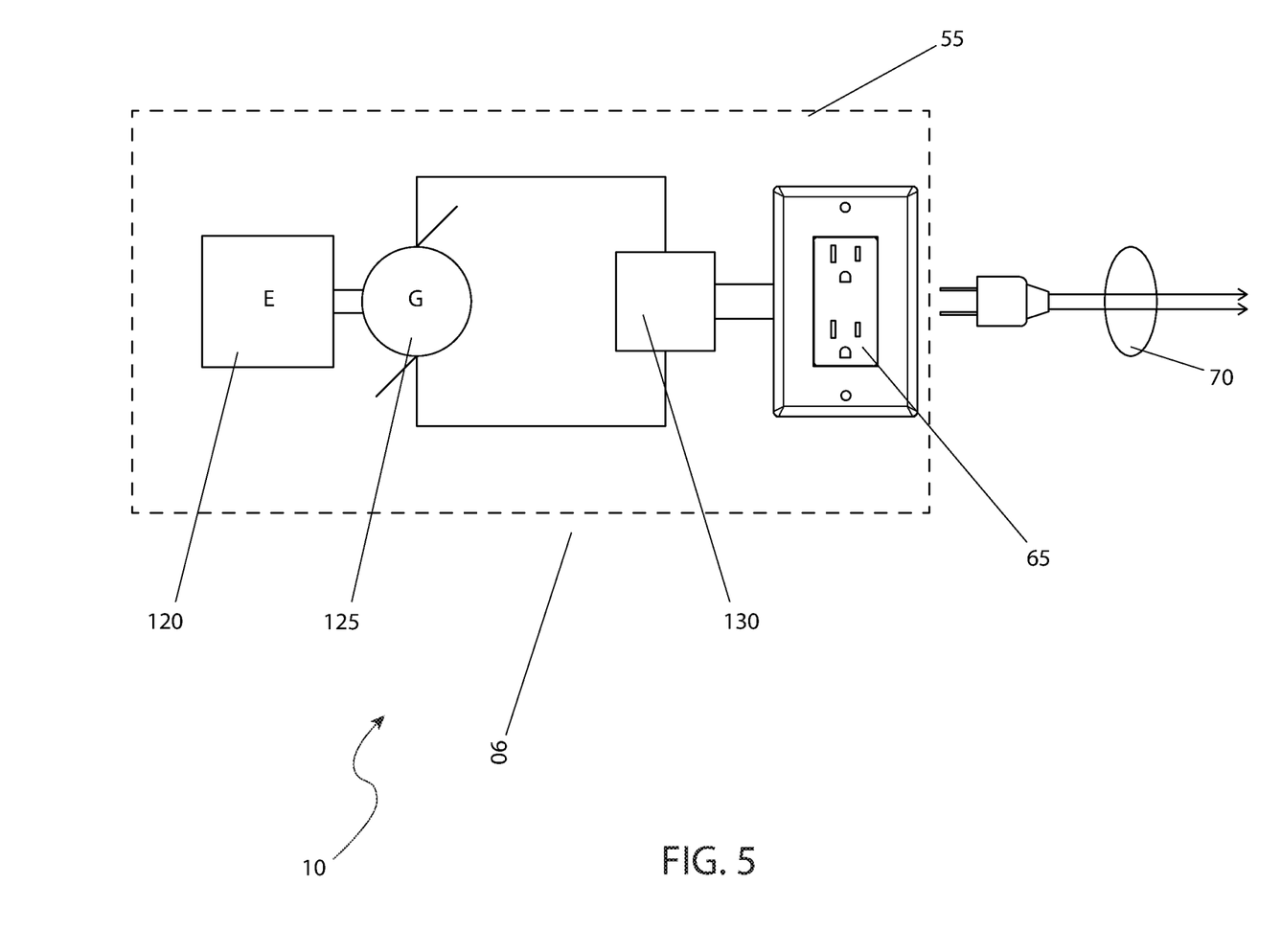
FIG. 5 is an electrical block diagram of the portable AC generating device, according to the first embodiment of the present invention; and, FIG. 6 is an electrical block diagram of the portable AC generating device, according to the second embodiment of the present invention.

Referring next to FIG. 5, an electrical block diagram of the device 10, according to the first embodiment of the present invention is disclosed. The gasoline-powered electric generator 55 consists of a gasoline-powered engine 120 that is mechanical communication with a generator 125. The output of the generator 125 may be directly connected to the AC receptacle 65 or pass through a solid-state inverter 130 as shown. The yard equipment power cord 70 then connects into the AC receptacle 65 in a customary manner.

Figure 6:
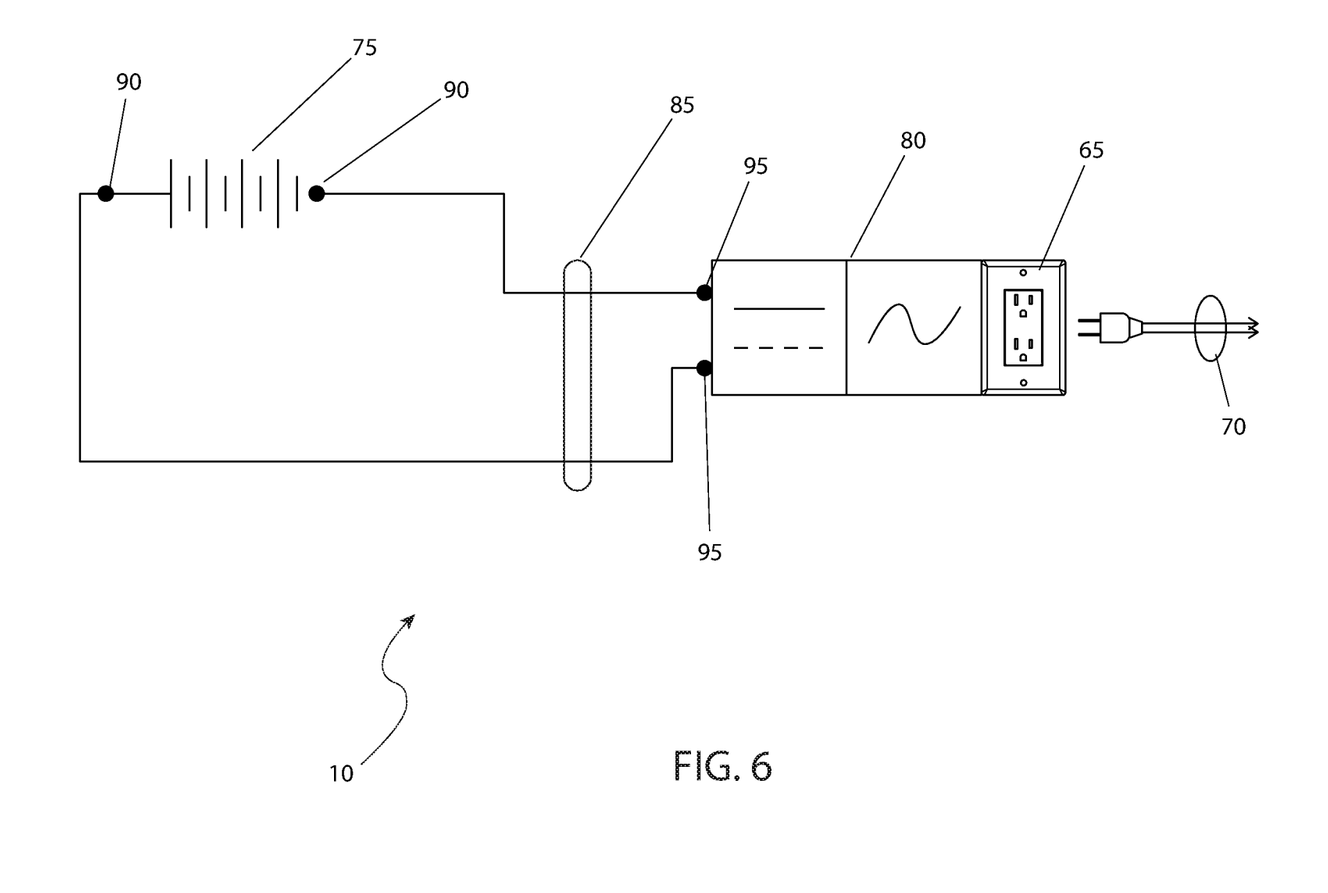

Referring to FIG. 6, an electrical block diagram of the device 10, according to the second embodiment of the present invention is depicted. The deep cycle battery 75 is in electrical communication with the DC to AC inverter 80 with the aid of the battery cables 85 that is connected between the battery terminals 90 and the input terminals 95. The electrical output of the DC to AC inverter 80 is then provided at the AC receptacle 65. The yard equipment power cord 70 then connects into the AC receptacle 65 in a customary manner.

2. OPERATION OF THE PREFERRED EMBODIMENT

The multiple embodiments of the present invention can be utilized by the common user in a simple and effortless manner with little or no training. It is envisioned that the device 10 would be constructed in general accordance with FIG. 1 through FIG. 6. The user would procure the device 10 from conventional procurement channels such as hardware stores, home improvement stores, mechanical supply houses, mail order and internet supply houses and the like. It is envisioned that the device 10 would be supplied in either the first embodiment of FIG. 1, the second embodiment of FIG. 2, or a combination unit that allows for the switching in and of the gasoline-powered electric generator 55 with the deep cycle battery 75 and the DC to AC inverter 80. It is also envisioned that the device 10 could be made available in a version that includes the backpack frame 15 along with needed attachment straps 60 and battery cables 85 to allow the user 100 to utilize previously purchased gasoline-powered electric generator 55 or a deep cycle battery 75 and battery cables 85. It is also known that the attachment of the first shroud 61 to the first embodiment of the device 109, or the second shroud 62 to the second embodiment of the device 10, can be performed as necessary or desired.

After procurement and prior to utilization, the device 10 would be prepared in the following manner: the user 100 would start the gasoline-powered electric generator 55 and connect the yard equipment power cord 70 to the AC receptacle 65 in the case of the first embodiment, or turn on the DC to AC inverter 80 in the case of the second embodiment; next the backpack frame 15 would be applied to the shoulders 110 of the user and secured with the shoulder straps 30; the waist strap 35 would be applied and secured to the waist area 115. At this point in time, the device 10 is ready for utilization.

During utilization of the portable backpack-mounted AC generating device 10, the following procedure would be initiated: the user would operate the electrically-powered yard equipment 105 in a customary and transparent manner. The user is afforded complete flexibility without being tethered by a conventional power cord that is connected to a stationary AC outlet.

After use of the second embodiment of the device 10, the deep cycle battery 75 would be recharged using well-known recharging methods prior to the next usage cycle. During normal use, the wheels 26 do not contact any ground surface. When it is desired to transport the entire device 10 with the gasoline-powered electric generator 55 installed thereon, the device is tipped forwardly (i.e., pivoting on the wheel housings 27) until the wheels 26 contact the ground surface. Then the user can grasp the adjustable handle 21 and transport the device 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A portable AC generating device, comprising:
   a backpack frame having a wheeled frame, a handle, a plurality of cross members, a pair of shoulder straps, a waist strap, a back padding, a bottom platform, an upper part, and a lower part;
   a pair of support straps supporting the bottom platform;
   a gasoline-powered electric generator placed upon the bottom platform and held in place by one or more attachment straps, the gasoline-powered electric generator provides one or more AC receptacles each producing AC power at the desired voltage and current;
   a yard equipment power cord in electrical communication with the one or more AC receptacles; and
   a shroud covering over the gasoline-powered electric generator and the bottom platform from inclement weather;
   wherein the upper part of the backpack frame terminates in a pair of parallel upright members;
   wherein the handle allows an arm to telescope within each of the pair of parallel upright members of the backpack frame;
   wherein the handle includes a pair of spring-loaded pins that are engaging a plurality of vertically aligned apertures to site the handle at a desired distance from the backpack frame;
   wherein the shroud is removably attachable to the bottom platform and the backpack frame with a plurality of first clamps that enables the shroud to quickly be attached or detached;
   wherein attached to an inner side of the backpack frame is a pair of wheel housings having a wheel rotatably attached within each of the pair of wheel housings;
   wherein the pair of wheel housings have a portion thereof that extends outside of the housing in order to enable contact with a surface to transport the portable AC generating device; and
   wherein the wheels are mounted within the housings such that they do not contact the surface when the portable AC generating device is resting on the surface.

2. The portable AC generating device, according to claim 1, wherein each of the pair of parallel upright members includes a plurality of apertures.

3. The portable AC generating device, according to claim 1, wherein the handle is "U"-shaped.

4. The portable AC generating device, according to claim 1, wherein attached to the lower part of the pair of parallel upright members of the backpack frame is the bottom platform.

5. A portable AC generating device, comprising:
   a backpack frame having a wheeled frame, a handle, a plurality of cross members, a pair of shoulder straps, a waist strap, a back padding, a bottom platform, an upper part, and a lower part;
   a pair of support straps supporting the bottom platform;
   a deep cycle battery placed upon the bottom platform that is held in place by one or more first attachment straps;
   a DC to AC inverter located on the upper portion of the backpack frame and that is held in place with one or more second attachment straps;
   a pair of battery cables electrically connecting the battery terminals of the deep cycle battery to input a plurality of terminals of the DC to AC inverter;
   an AC receptacle provided on the DC to AC inverter;
   a yard equipment power cord in electrical communication with the one or more AC receptacles; and
   a shroud covering over a gasoline-powered electric generator and the bottom platform from inclement weather;
   wherein the handle allows an arm to telescope within each of the pair of parallel upright members of the backpack frame;
   wherein the handle includes a pair of spring-loaded pins that are engaging a plurality of vertically aligned apertures to site the handle at a desired distance from the backpack frame;
   wherein the shroud is removably attachable to the bottom platform and the backpack frame with a plurality of first clamps that enables the shroud to quickly be attached or detached;
   wherein attached to an inner side of the backpack frame is a pair of wheel housings having a wheel rotatably attached within each of the pair of wheel housings;
   wherein the pair of wheel housings have a portion thereof that extends outside of the housing in order to enable contact with a surface to transport the portable AC generating device; and
   wherein the wheels are mounted within the housings such that they do not contact the surface when the portable AC generating device is resting on the surface.

6. The portable AC generating device, according to claim 5, wherein each of the pair of parallel upright members includes a plurality of apertures.

7. The portable AC generating device, according to claim 5, wherein the handle is "U"-shaped.

8. The portable AC generating device, according to claim 5, wherein attached to the lower part of the pair of parallel upright members of the backpack frame is the bottom platform.

* * * * *